United States Patent [19]

Lagerstedt et al.

[11] Patent Number: 4,585,498

[45] Date of Patent: Apr. 29, 1986

[54] METHOD FOR SEALING AN EMPTYING OPENING AND AN ARRANGEMENT FOR THE REALIZATION OF THE METHOD

[75] Inventors: Jan E. R. Lagerstedt, Malmö; Bengt-Arne Arnspang, Lund, both of Sweden

[73] Assignee: Tetra Pak International AB, Lund, Sweden

[21] Appl. No.: 680,819

[22] Filed: Dec. 12, 1984

[30] Foreign Application Priority Data

Dec. 15, 1983 [SE] Sweden .............................. 8306939

[51] Int. Cl.⁴ .......................... B65B 7/28; B65D 17/50
[52] U.S. Cl. ....................................... 156/69; 53/329; 53/478; 156/274.4; 156/308.4; 156/379.7; 156/380.3; 156/475; 156/497; 220/270; 220/359; 493/103
[58] Field of Search ..................... 156/69, 272.4, 497, 156/514, 379.7, 380.3, 380.6, 475, 274.4, 308.4; 220/260, 359, 270; 493/103; 53/329, 428

[56] References Cited

U.S. PATENT DOCUMENTS

| | | | |
|---|---|---|---|
| 3,361,611 | 1/1968 | Stark | 156/514 X |
| 3,549,440 | 12/1970 | Adcock et al. | 156/69 |
| 4,266,993 | 5/1981 | Olsen | 156/69 |
| 4,373,978 | 2/1983 | Patterson | 156/69 |

Primary Examiner—Robert A. Dawson
Attorney, Agent, or Firm—Burns, Doane, Swecker & Mathis

[57] ABSTRACT

A packing container of the non-returnable type is frequently manufactured from laminated material which comprises a central carrier layer of paper with thermoplastic layers applied to both sides. As an opening arrangement, a pre-punched pouring opening is used which is covered on the one hand by a tear-off cover strip located outside the packing container and, on the other hand, by an inner protective strip. A method for sealing an emptying opening in accordance with the invention ensures that a part of the inner protective strip corresponding to the shape and size of the pouring opening accompanies the cover strip since the strips are heat-sealed to each other at the same time as they are pressed against each other by means of pressure fluid. An arrangement for carrying out the method comprises a heating device with a heatable zone and an outlet for pressure fluid.

8 Claims, 3 Drawing Figures

METHOD FOR SEALING AN EMPTYING OPENING AND AN ARRANGEMENT FOR THE REALIZATION OF THE METHOD

BACKGROUND AND SUMMARY OF THE INVENTION

The present invention relates to a method for the sealing of a packing material provided with an emptying opening with two thermoplastic layers located by means of heat and pressure on opposite sides of the opening to each other. The invention also relates to an arrangement by which the method is carried out.

Packing containers of the non-returnable type are frequently manufactured from laminated material which is folded and sealed so that a packing container of the desired shape is obtained. When the packing container is intended for liquid contents, e.g. milk or juice, it is then provided with some form of opening arrangement. The opening arrangement may consist of an emptying opening punched out in the top of the packing container which is provided with a covering, tear-off strip, a so-called pull-tab. The packing laminate usually comprises a central layer of fibrous material e.g. paper, which is covered on either side by thermoplastic layers. To prevent the paper layer, exposed in the cut edges around the emptying opening, from absorbing some contents it was necessary in this type of opening arrangements, in addition to the outer cover strip, to also arrange an inner, liquid-tight protective strip which is sealed to the inside of the packing material around the emptying opening. When the packing container is to be opened the emptying opening is exposed by tearing off the outer cover strip. In doing that a part of the inner protective strip corresponding to the shape of the emptying opening also has to be removed, and this is achieved simplest by sealing the cover strip and the protective strip to each other within a region corresponding to the area of the emptying opening. This design makes it possible to expose the emptying opening on tearing off the cover strip in one action, but it is found in practice that it may sometimes be difficult to break through and completely remove the desired parts of the inner protective strip. Moreover, parts of the protective strip often remain in the emptying opening, so that an edge consisting of a number of plastic shreds is formed which renders difficult the emptying out of the contents through the opening in a satisfactory manner.

The disadvantages are due, among other things, to an unsatisfactory adhesion between cover strip and protective strip which is particularly marked on the parts located along the edge area of the emptying opening. It has been endeavoured hitherto to overcome these disadvantages by using, for the sealing together of the strips and the packing material, a resilient sealing or pressure pad which thanks to its flexibility compensates for the variations in thickness which are caused by the absence of packing laminate in the actual emptying opening. This method has proved to give a satisfactory adhesion in the central parts of the emptying opening, but cannot eliminate the unsatisfactory adhesion along the edges of the emptying opening.

It is a general object to provide a method for the design of an emptying opening of the abovementioned type which makes it possible to ensure a good seal between the outer cover strip and the inner protective strip within the whole area of the emptying opening.

It is a further object to provide a method which in the aforementioned emptying opening makes it possible to seal the cover strip and the protective strip to each other right to the edge line of the emptying opening. This is particularly important in the part of the emptying opening where the breaking through of the protective layer commences when the cover strip is removed, since otherwise it can be difficult to break through and completely remove the part of the protective strip corresponding to the shape of the emptying opening.

These and other objects have been achieved in accordance with the invention in that a method for the sealing on a packing material provided with an emptying opening, of two thermoplastic layers located on opposite sides of the opening to each other by means of heat and pressure has been given the characteristic that in the emptying opening the one layer, by means of a pressure fluid, is made to rest against the other layer at the same time as the layers are heated to sealing temperature.

By means of the method in accordance with the invention it becomes possible to bring about a uniform and extensive contact and sealing between layers within the whole area of the emptying opening, at the same time as the limited, stronger heating along a part of the edge zone of the emptying opening ensures a distinct adhesion between the strips immediately adjoining the cut edge of the laminate so that an easy and complete tearing off of the area of the protective layer corresponding to the emptying opening is ensured when the cover strip is removed.

It is a further object of the present invention to provide an arrangement for the realization of the method. Such an arrangement in accordance with the invention comprises a heating device, the working surface of which can be pressed against a holding-up or support tool provided with a plane working surface. The heating device being heatable within a limited heating zone and being provided with an outlet for pressure medium.

The arrangement in accordance with the invention differs from similar known arrangements first and foremost in that it operates with a pressure fluid and in that it has a heating zone adapted to the shape of the emptying opening with a limited intensive heating region. As a result, a uniform pressure distribution is made possible which on heating and pressing of the protective layer against the cover layer ensures a complete shaping of the same over the whole surface of the emptying opening, at the same time as the limited intensive heating makes it possible to obtain the desired strong flattening out and resting against one edge of the emptying opening.

A preferred embodiment of the method and arrangement in accordance with the invention will now be described in more detail with special reference to the attached drawing which illustrates schematically the method and the arrangement in accordance with the invention.

DETAILED DESCRIPTION OF THE DRAWINGS

Figure 1:
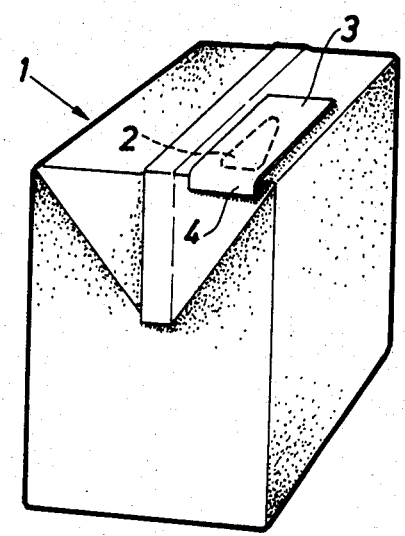
FIG. 1 shows in perspective a packing container of the known type on which a cover strip is fitted over an emptying opening.

In FIG. 1 a packing container 1 of a known type is shown which is manufactured from a packing laminate which comprises a central carrier layer of paper with laminated layers of thermoplastic material, e.g. polythene, on either side. The parallelepipedic shape of the packing container 1 has been obtained in that the packing laminate has been converted in a known manner by means of folding and sealing. The packing container 1 is provided on its upper surface with an opening arrangement in the form of an emptying opening 2 which is indicated by means of a broken line in FIG. 1. The emptying opening 2 is covered by means of a tear-off cover-strip 3 (a so-called pull-tab) which is sealed to the packing container in such a manner that it completely covers the emptying opening and prevents leakage through the same. At the one end of the cover strip 3 there is a non-sealed griplug 4 which is intended to facilitate the gripping of the cover strip 3 when the same is to be torn off so as to expose the emptying opening and allow the emptying out of the contents present in the packing container 1.

The packing container shown in FIG. 1 constitutes merely one example of a type of packing container to which the method and the arrangement in accordance with the invention can be applied. Essential for the invention is only that the packing container, or more precisely the packing laminate from which the packing container is to be formed, should be provided with a premanufactured emptying opening which is covered by protective layers which are sealed to the packing laminate and to each other with the help of heat and pressure.

Figure 3:
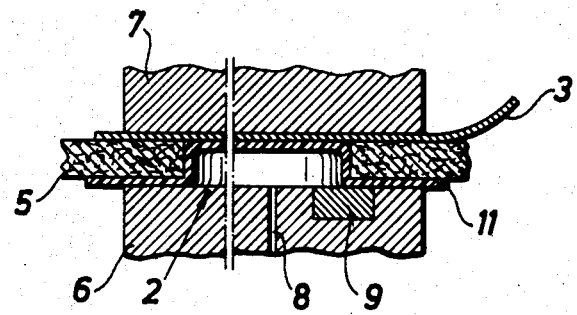
FIG. 3 is a section through a preferred embodiment of the arrangement in accordance with the invention for the realization of the method in accordance with the invention.

A preferred embodiment of an arrangement for the realization of the method in accordance with the invention is illustrated in FIG. 3. It is evident from the figure how a packing laminate 5 is provided with a premanufactured emptying opening 2. The packing laminate comprises a carrier layer of fibrous material, e.g. paper, which is covered on either side by thermoplastic material. Included in the laminate is also a layer of aluminum foil which on the one hand serves to reduce the permeability for gas of the material and on the other hand makes it possible to heat-seal the laminate with the help of high-frequency sealing (induction sealing). Packing laminates of this type are well-known and for the sake of simplicity the different layers included in the laminate are not illustrated in FIG. 3. On the one side of the packing laminate 5 (the side which when the packing laminate has been converted to packing containers forms the outside) there is a cover strip 3, and on the opposite side of the packing laminate there is a protective strip or protective layer 11. The cover strip 3 as well as the protective layer 11 have an area which is such that it covers the actual emptying opening 2 as well as a region around the same. A corresponding area is also found on the plane working surfaces facing towards each other of two sealing tools, in the form of a heating device 6 and a holding-up or support tool 7 located opposite the emptying opening 2. The heating device and the holding-up tool are located opposite each other and are adapted to be moved towards and away from each other respectively by means of mechanical driving elements known in themselves and not shown in the drawing.

Figure 2:
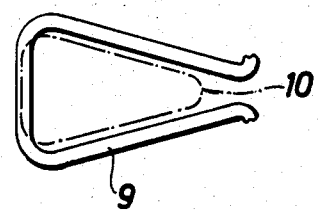
FIG. 2 shows schematically an emptying opening and an induction loop adapted to its shape.

The heating device 6 comprises a substantially central outlet or passage 8 for pressure fluid located opposite the emptying opening 2. The outlet or passage 8 is connected via ducts (not shown) to a source of a suitable pressure fluid, e.g. air. The heating device 6 also comprises a conductor or induction loop 9 inserted in the plane working surface which extends in the heating device in a pattern adapted to the shape of the emptying opening (FIG. 2). The conductor or induction loop 9 may consist of copper and be situated in a groove recessed in the heating device 6 made of non-conducting material. Since the packing laminate 5, as mentioned previously, comprises a layer of conducting material (aluminium foil) it will be possible to heat-seal the laminate with the help of induction sealing. This method is well-known and briefly operates so that the induction loop 9 is connected to a source of high-frequency current, alternating current being induced in the aluminium layer of the packing laminate 5. Losses arising thereby heat the aluminium layer within a limited area along the induction loop and the heat generated is conducted further to adjoining thermoplastic layers so that these fuse together and can be sealed liquid-tight to each other through the application of an appropriate pressure.

When the packing laminate 5 provided with emptying opening 2 is to be provided prior to the conversion to individual packing containers with the sealing layers located on opposite side of the opening, the packing laminate is placed between the heating device 6 and the holding-up or support tool 7 whilst these are in open position, that is to say at a distance from each other. Between the packing laminate 5 and the heating device 6 and the holding-up tool 7, respectively, the protective layer 11 and the cover strip 3 are placed in the desired position over the emptying opening 2, at the same time as it is ensured that the emptying opening 2 is in correct position in relation to the induction loop 9 present in the heating device 6. The correct position is illustrated schematically in FIG. 2 where the outer contour of the emptying opening 2 is indicated by means of a dash-dotted line 10. As is evident from the said figure the induction loop 9 extends for the greater part at some distance (3–4 mm) outside the centre line 10 of the emptying opening 2 while on a limited part of the emptying opening the loop runs parallel with and opposite opening. On the part of the emptying opening located closest to the grip-lug 4 of the cover strip 3 the induction loop will form an intensive heating region wherein the thermoplastic layers are heated to a substantially higher degree than is the case along the remaining parts of the cut line 10 or over the remaining area of the emptying opening. Within the intensive heating region the alternating field generated will be concentrated because of a so-called edge effect occuring, at the same time as the cooling of the aluminium foil will be slight, since the free edge of the foil is not in direct contact with any material which can dissipate heat.

After the packing laminate as well as the cover strip 3 and the protective layer 11 have thus been placed in correct position between the heating device 6 and the holding-up or support tool 7, the latter are moved towards each other so that the different material layers are pressed together. At the same time alternating current is fed to the induction loop 9 so that the material layers situated between the heating device 6 and the holding-up or support tool 7 are heated. At the same time pressure fluid, preferably compressed air, is fed via the outlet or passage 8 to the space between the sealing jaws which has the effect that the heated protective layer 11 is pressed into the emptying opening 2 and will be resting against the part of the cover strip 3 directly opposite the emptying opening 2. Owing to the simultaneous heating to melting temperature of the material (in case of polythene layers 120°-140° C.) the material layers will be sealed to each other within this region and this is a pre-condition if the protective layer 11 is to accompany the cover strip 3 as the latter is torn off when the packing container thereafter is to be opened. At the same time the edge zones bordering on the emptying opening 2 will be heated to such a degree that the parts of the cover strip 3 as well as of the protective layer 11 in contact with the thermoplastic layers of the packing laminate 5 will be sealed in a liquid-tight manner to the packing laminate under the effect of the pressure from the sealing jaws pressed together, that is to say the heating device 6 and the holding-up tool 7. In the intensive heating region referred to earlier on the front part of the emptying opening 2 (that is to say at the end of the emptying opening facing towards the grip-lug 4) a stronger heating will take place which means that adjoining parts of the thermoplastic layers will be heated to a higher degree than other parts. The part of the protective layer 11 situated opposite the induction loop 9 will thereby become more plastic and fluid than other parts, so that the pressure fluid flowing in via the outlet or passage 8 will press the part of the protective layer to be in full contact with the cover strip 3 along this part of the cut edge. In this manner an extremely good sealing together within this region and at the same time a thinning of the protective layer 11 is achieved which together have the effect that the protective layer 11, when the cover strip 3 is torn off the finished packing container with the intention of opening the same, ruptures more easily and therefore accompanies the cover strip 3 with greater certainty so that the emptying opening 2 is wholly exposed.

Thanks to the method and arrangement in accordance with the invention it is possible to overcome two important disadvantages associated with previously known methods and arrangements, namely in the first place that an incomplete seal is obtained between the cover strip and the protective layer 11 within the region of the emptying opening 2, and secondly that no obvious breaking indication existed in the part of the protective layer 11 where the tearing up has to start when the cover strip 3 is to be removed.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limiting to the scope and spirit of the invention as set forth in the appended claims.

What is claimed is:

1. A method for sealing two thermoplastic layers on an emptying opening provided in a packing material, said thermoplastic layers located on opposite sides of the opening and sealed to each other by means of heat and pressure including the steps of: positioning one of said two layers against the remaining layer of fluid pressure, heating the two layers in a first heating region and a second heating region, intensifying the heating in the second heating region to a substantially higher degree than the first heating region substantially concurrently with said positioning.

2. A method in accordance with claim 1, wherein the second heating region is within a limited edge zone of the opening.

3. A method in accordance with claim 2, wherein the heating within the edge zone is such that the one thermoplastic layer commences to flow.

4. A method in accordance with claim 2, wherein the pressure fluid is air.

5. An arrangement for sealing two thermoplastic layers on an emptying opening provided in a packing material, said thermoplastic layers located on opposite sides of the opening and sealed to each other by means of heat and pressure, comprising: a heating device defining a first working surface; a support tool provided with a second working surface, said first working surface being movable towards and away from said second working surface, said heating device defining a limited heating zone and being heatable within said zone, the limited heating zone including two heating regions; a first heating region spaced from the emptying opening and a second heating region, said second heating region defining an area of intensive heating so as to heat the thermoplastic layers to a substantially higher degree than said first heating region, the heating device provided with a fluid passage for a pressure medium.

6. An arrangement in accordance with claim 5, wherein the intensive heating area is along a limited part of an edge of the emptying opening.

7. An arrangement in accordance with claim 6, further comprising an induction loop located in the first working surface which in the intensive heating area extends along the edge of the emptying opening.

8. An arrangement in accordance with claim 7, wherein the working surface of the heating device is plane.

* * * * *